United States Patent [19]

Fukuhara

[11] Patent Number: 4,633,260

[45] Date of Patent: Dec. 30, 1986

[54] LORAN-C SIGNAL RECEIVING APPARATUS

[75] Inventor: Hiroshige Fukuhara, Yokosuka, Japan

[73] Assignee: Nissan Motor Company, Limited, Yokohama, Japan

[21] Appl. No.: 657,662

[22] Filed: Oct. 4, 1984

[30] Foreign Application Priority Data

Oct. 7, 1983 [JP] Japan ............................. 58-187804
May 18, 1984 [JP] Japan ............................. 59-99733

[51] Int. Cl.⁴ .............................................. G01S 1/24
[52] U.S. Cl. .................................... 342/389; 364/452
[58] Field of Search ..................... 343/388, 389, 390; 364/452

[56] References Cited

U.S. PATENT DOCUMENTS 3,868,690 2/1975 Miller .................................. 343/390
4,166,275 8/1979 Michaels et al. ................... 343/389
4,268,830 5/1981 Brodeur ............................. 343/389
4,482,896 11/1984 Menick ............................. 343/390

FOREIGN PATENT DOCUMENTS 55-2938 1/1980 Japan .
55-6261 1/1980 Japan .
56-2312 1/1982 Japan .
57-44869 3/1982 Japan .
57-192880 11/1982 Japan .

OTHER PUBLICATIONS

O'Halloran et al; "Use of Loran-C in AVM ANDC² Systems", 1980 Carnahan Conference on Crime Countermeasures, University of Kentucky, May 14-16, 1980.

Primary Examiner—Theodore M. Blum
Attorney, Agent, or Firm—Lowe, Price, LeBlanc, Becker & Shur

[57] ABSTRACT

A system for detecting a particular cycle of a received Loran-C signal in a Loran-C receiving apparatus, recognizes the envelope of a carrier wave in each Loran-C pulse for a predetermined duration after the onset of the Loran-C pulse. The system compares the detected envelope to reference envelope data so as to identify where on the actual Loran-C envelope the measured envelope lies in order to identify the particular cycle of the received Loran-C pulse.

15 Claims, 19 Drawing Figures

LORAN-C SIGNAL RECEIVING APPARATUS

BACKGROUND OF THE INVENTION

1. Field of the Invention

The present invention relates generally to a receiving apparatus used in a Loran-C navigation system on a basis of a hyperbolic electromagnetic navigation technique, and relates particularly to a Loran-C signal receiving apparatus capable of accurately and speedily identifying a particular cycle of a carrier wave in each received Loran-C pulse.

2. Description of the Prior Art

A Loran (Long range navigation)-C system employs a chain comprising one master transmission station and two or more secondary transmission stations.

Figure 1:
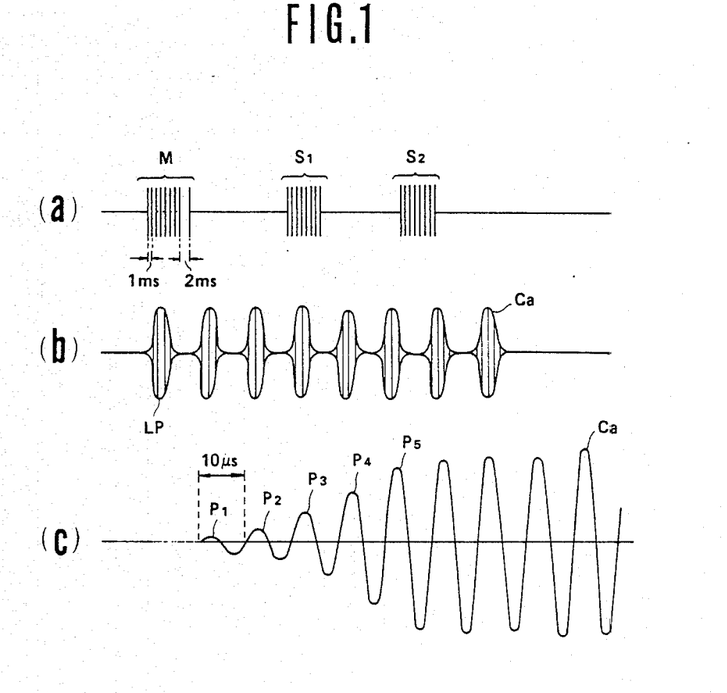
FIG. 1 is a waveform pattern of the Loran-C signal in the case when one master transmission station and two secondary transmission stations constitute one chain.

The master transmission station transmits nine Loran pulses as shown by M of (a) in FIG. 1.

Each secondary transmission station transmits eight Loran pulses as shown by $S_1$ and $S_2$ of (a) in FIG. 1. Each transmission station generates the above-described Loran pulses at a pulse repetition rate prescribed for each chain. In addition, each secondary transmission station generates its secondary station Loran pulses with a coding delay with respect to the transmission pulse of the master transmission station distinct from other secondary transmission stations.

Hence, in the Loran-C signal receiving apparatus, the difference in distance to the two fixed points represented by the master and each secondary transmission station can be obtained from the delay between receipt of the secondary transmission station pulses and the master transmission station pulses so that the location of the Loran-C signal receiving apparatus is specified by the intersection of Loran hyperbolics drawn for each of the two sets of two fixed points.

In the above-described Loran-C signal receiving apparatus, a particular cycle of the carrier wave in each received pulse (generally, the third cycle of the carrier wave) is tracked in order to measure the reception delay time of the pulses from the secondary transmission stations with respect to those from the master transmission station.

The carrier wave Ca of the above-described Loran-C signal has a frequency of 100 killohertz and hence a period of 10 microseconds as appreciated from (c) in FIG. 1 drawn on an expanded time axis.

A conventional Loran-C receiving apparatus performing this function is disclosed in Japanese Patent Application Open Nos. 55-2938, No. 55-6261, and Patent Publication No. 56-2312. In addition, the general concepts of Loran-C receiving apparata are disclosed in U.S. Pat. No. 4,268,830 to Lester R. Brodeur filed on Apr. 9, 1979.

The method for identifying the third cycle of the carrier wave Ca in conventional Loran-C receiving apparata is that once the Loran-C pulse LP is received, a sampling pulse is generated in synchronization with the pulse repetition rate (for example, in the Japanese Maritime Area 99.7 milliseconds) of the Loran-C pulse LP. If the time-integrated value of the signal amplitude sampled in response to sampling pulses exceeds a predetermined threshold value, the corresponding phase of the signal is determined to be one of the peaks $P_1$, $P_2$, and $P_3$ of the carrier wave Ca. After detecting the accompanying peaks of the carrier wave, the third cycle of the carrier wave Ca in each pulse is identified by determining that the third sampled value in excess of the threshold is the peak of the third cycle.

However, since conventional Loran-C receiving apparatus identifying the third cycle of the carrier wave by detecting the peak of the carrier wave, due to the difficulty in detecting first and second peaks accurately in cases where the S/N ratio (Signal-to-Noise) is excessly low due to external noise, the third cycle may easily be improperly identified.

If the above-described Loran-C receiving apparatus is mounted in an automotive vehicle in order to monitor the position of the moving vehicle, since the Loran-C signal will be highly attenuated in urban or mountainous areas, the S/N ratio of the received signal will often be extremely low. Therefore, the above-described problem would be significant.

SUMMARY OF THE INVENTION

With the above-described problem in mind, it is an object of the present invention to provide a Loran-C receiving apparatus which can accurately identify a particular cycle of the carrier wave in a short period of time even if the S/N ratio of the received signal is reduced below normal values.

To achieve the above-described object, the Loran-C receiving apparatus according to the present invention is provided with means for identifying a particular carrier wave cycle in individual Loran-C pulses of the received Loran-C signal, the particular cycle identifying means comprising: (a) means for measuring the envelope of the received Loran-C signal carrier wave peaks over a known portion of a Loran-C pulses including the particular cycle; (b) means for storing a reference envelope corresponding to the known portion; and (c) means for comparing the measured envelope with the reference envelope and identifying the particular cycle of the received Loran-C pulse on the basis of the results of comparison.

BRIEF DESCRIPTION OF THE DRAWINGS

A more complete understanding of the present invention may be obtained from the following description in conjunction with the drawings in which like reference numerals designate corresponding elements and in which:

FIGS. 8(I) and 8(II) are graphs of the probability distribution of the standard variation and the number of times the addition is performed;

DETAILED DESCRIPTION OF THE PREFERRED EMBODIMENT

Reference will be made to the drawings in order to facilitate understanding of the present invention.

Figure 2:
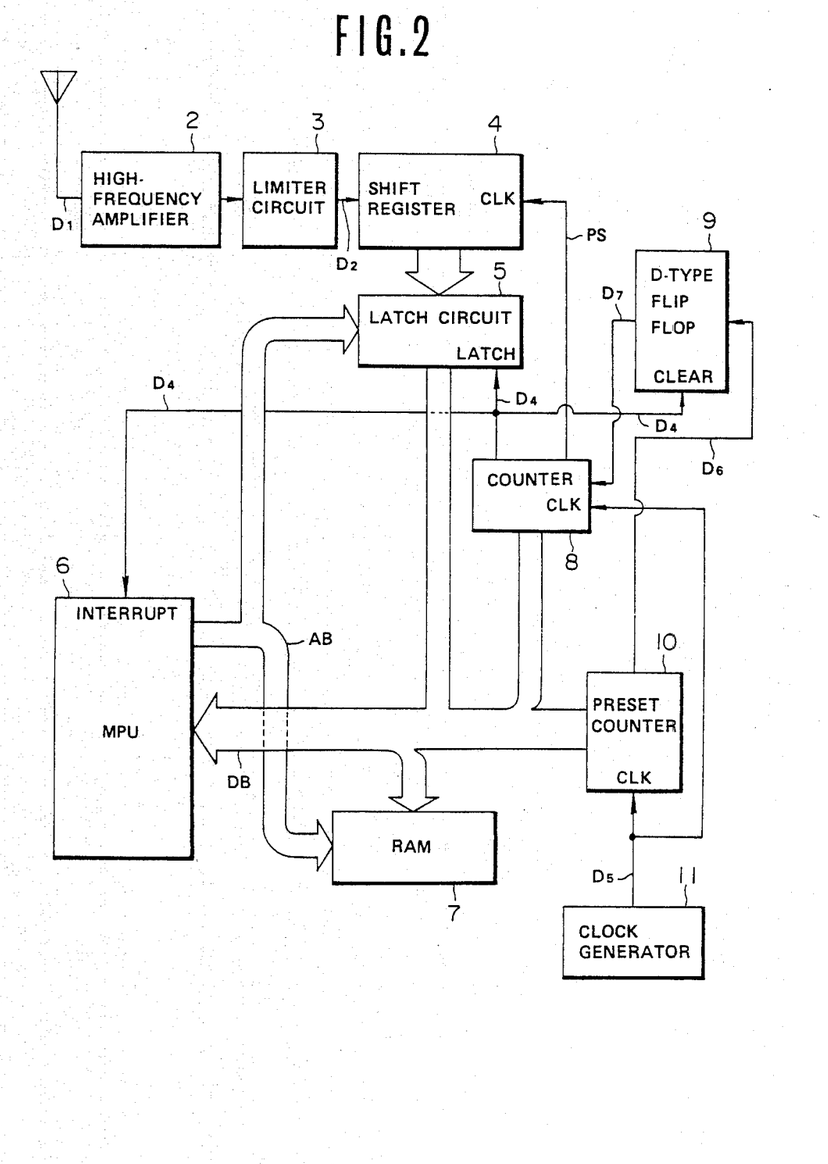
FIG. 2 is a circuit block diagram of first and second preferred embodiments in the Loran-C signal receiving apparatus according to the present invention.

FIG. 2 is a block diagram of a first preferred embodiment.

It should be noted that the circuitry shown in FIG. 2 relates only to the main part of the present invention and that other components, e.g., an initial stage detection circuit for Loran-C pulses and circuitry for detecting and tracking zero-crossings of the Loran-C pulse carrier wave are omitted from this drawing.

The circuit structure of the Loran-C receiving apparatus is exemplified by U.S. Pat. No. 4,268,830 to Lester R. Brodeur filed on Apr. 19, 1979. The disclosure of this Patent document is hereby incorporated by reference.

In FIG. 2, numeral 2 denotes a high-frequency amplifier which amplifies a received signal $D_1$ including a Loran-C signal components via an antenna 1. The received and amplified signal is supplied to limiter 3. The limiter 3 shapes the received signal into rectangular wave for conversion into a digital signal consisting of single bits, the values of which will be designated "1" and "0".

A shift register 4 is a K-bit (for example, 160 bits) shift register which samples the digitallized received signal $D_2$ from the above-described limiter 3 synchronously with the pulses of an output signal PS from a counter 8.

A latch circuit 5 latches the full output of the shift register 4 such that all of the above-described 160 bits of data are latched as a single value in response to a frequency-divided pulse $D_4$ from the counter 8. A microprocessor MPU 6 supplies an address signal to the above-described latch circuit 5 and to a RAM (Ramdom Access Memory) 7 via address bus AB so that a transfer of various data is performed via data bus DB. When the interrupt terminal of the MPU 6 receives a frequency-divided pulse $D_4$ from the above-described counter 8, the data latched in the latch circuit 5 is transferred into a corresponding memory address of the RAM 7.

The clock signal generator 11 generates a clock pulse signal in sychronization with the carrier wave Ca of the Loran-C signal. The clock signal $D_5$ outputted by the clock signal generator 11 is supplied to a preset counter 10 and counter 8.

The preset counter 10 counts up to a predetermined number specified by a preset value from the MPU 6. The count output $D_6$ of the preset counter 10 is supplied into a D-type flip-flop 9. During the interval of time for which the count output $D_6$ is supplied from the preset counter 10, the output $D_7$ of the D-type flip-flop 9 remains "1". Upon receipt of a frequency-divided pulse $D_4$ from the counter 8 at a clear terminal, the output $D_7$ of flip-flop 9 returns to "0".

The counter 8 divides the frequency of clock signal $D_5$ received at its clock terminal by M while the output signal $D_7$ from the D-type flip-flop 9 is at the "1" level. The resulting sample pulses PS are supplied to a clock terminal CLK of the shift register 4. In parallel thereto, the frequency of clock signal $D_5$ is divided by N to produce the frequency-divided pulses $D_4$ which are then supplied to a latch terminal of the latch circuit 5, an interrupt terminal of the MPU 6, and a clear terminal of the D-type flip-flop 9.

It should be noted that the values of the above-described numbers N and M satisfy the relationships $N > M$ and $K = N/M$.

The operation of the circuit shown in FIG. 2 wherein the values are $N = 400$, $M = 2-5$, and $K = 160$ is described below.

Specifically, the shift register 4 is a 160-bit shift register. The counter 8 outputs the sample pulses PS at intervals of 2.5 microseconds and the frequency-divided pulses $D_4$ from the counter 8 are outputted at intervals of 400 microseconds.

Figure 3:
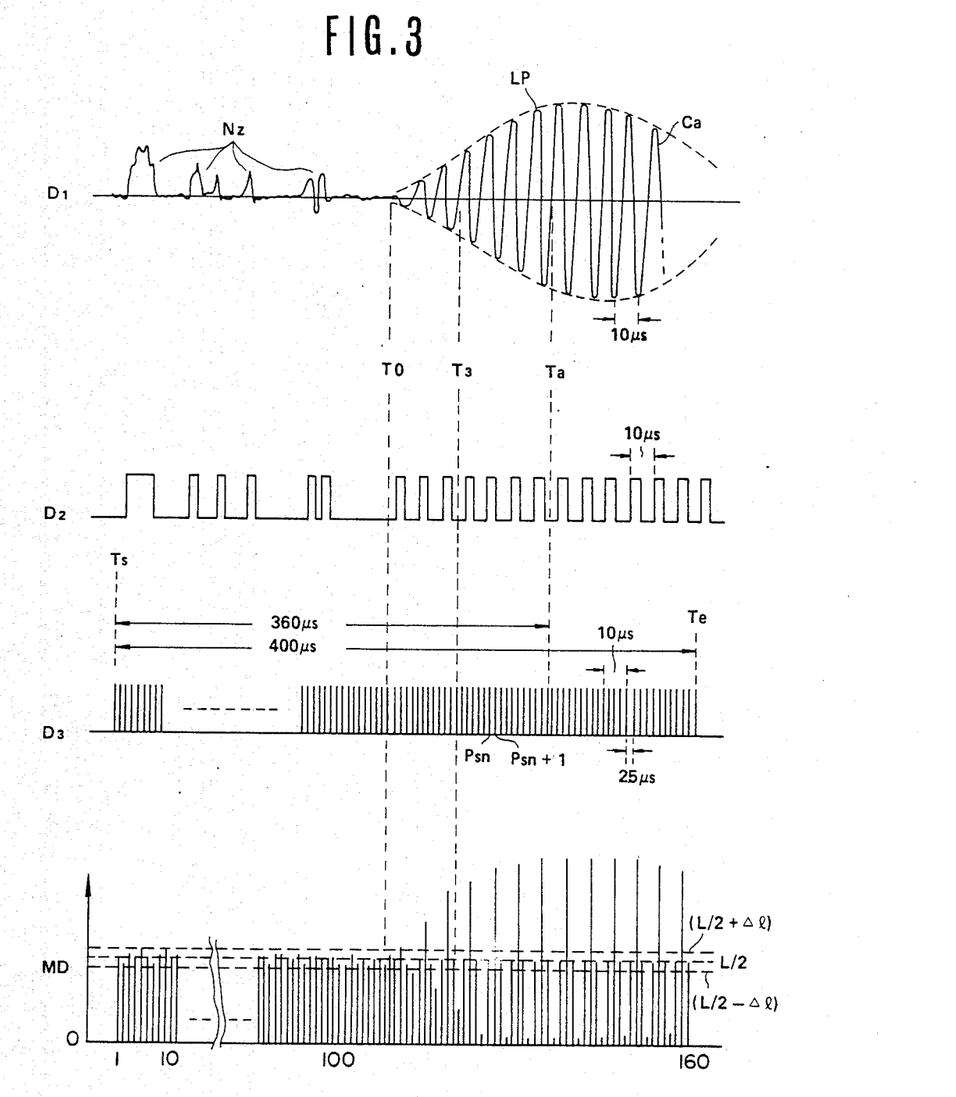
FIG. 3 is a timing chart showing the contents of memory addresses and main output signals of the circuit blocks in the Loran-C receiving apparatus for Loran-C pulses shown in FIG. 2.

It is also assume that the Loran-C receiving apparatus described above receives a signal $D_1$ via the antenna 1 with a low signal-to-noise (SN) ratio including a noise component $N_Z$ and a Loran-C component such as shown at $D_1$ in FIG. 3.

The final assumption is that the Loran-C receiving apparatus starts tracking the Loran-C pulse LP at a point Ta by means of a conventional automatic Loran-C pulse tracking circuit.

The above-described received signal $D_1$ is converted into a digital signal with two logical values "1" and "0" as shown at $D_2$ in FIG. 3.

Figure 4:
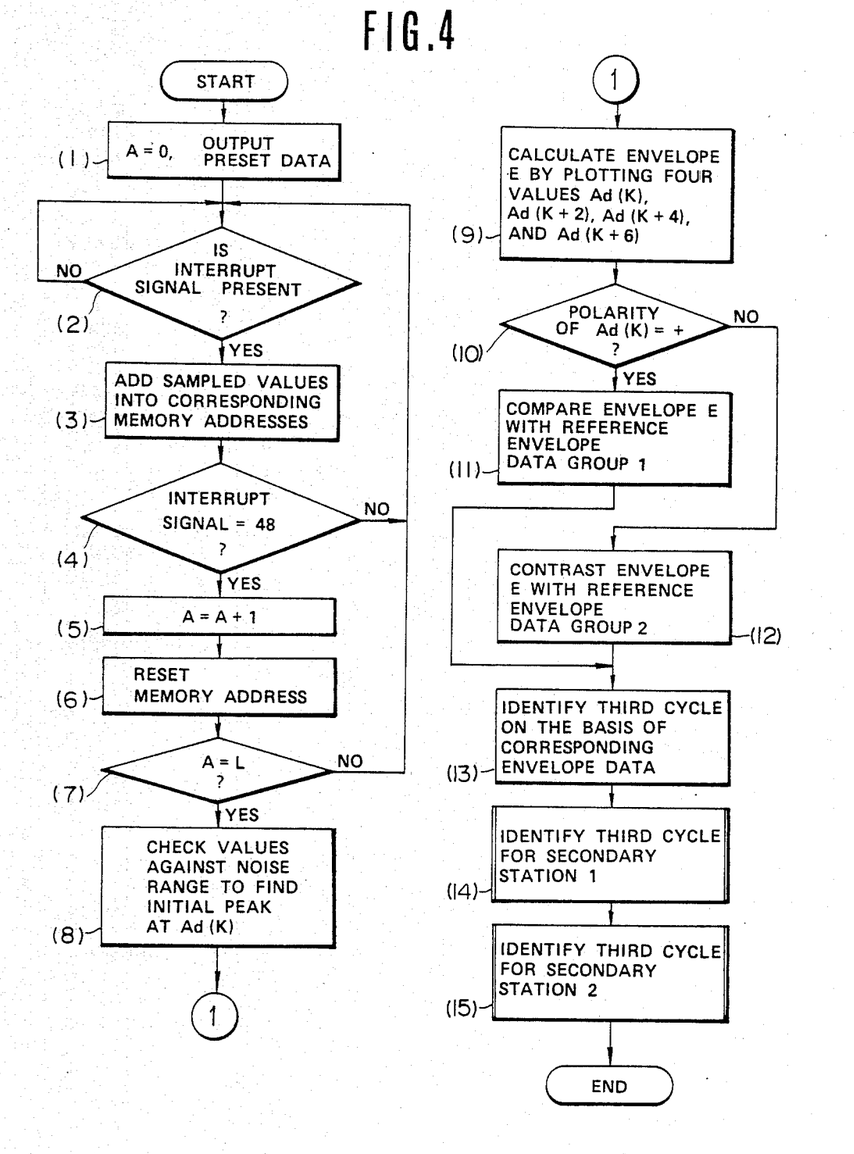
FIG. 4 is a processing flowchart for detecting the third cycle of each Loran-C pulse to be executed in microprocessor shown in FIG. 2.

FIG. 4 is a first operational flowchart to be executed by the above-described MPU 6. This processing routine is executed immediately after the Loran-C signal LP is detected and tracking (from time Ta) of the zero-crossing point of the carrier wave Ca begins.

In step (1), the MPU 6 resets an internal increment counter A and supplies a preset value to the preset counter 109. Thereafter, the count output $D_6$ is supplied to the D-type flip-flop 9 for an interval of 400 microseconds starting from a point Ts the phase of which is 360 microseconds prior to the first recognized zero-crossing point Ta of the Loran-C pulse LP as shown in FIG. 3.

Over the same interval, the counter 8 outputs 160 sample pulses PS at intervals of 2.5 microseconds. Hence, the output signal $D_2$ of the limiter 3 is sampled by the shift register 4 in response to each pulse of the sample pulse signal PS.

The sampling is carried out by the shift register 4. After one-hundred-sixty bits have been sampled, i.e., at a time Te 400 microseconds after the point Ts, a frequency-divided pulse $D_4$ is outputted by the counter 8. Accordingly, the sampled data (160 bits) in the shift register 4 are latched by the latch circuit 5 and the counting operation of the counter 8 is stopped in response to the level change of the output signal $D_7$ of the D-type flip-flop 9 to "0".

In addition, the frequency-divided pulse $D_4$ from the counter 8 is simultaneously supplied to the interrupt terminal of the MPU 6.

This allows the microprocessor 6 to break out of a loop at step (2) in which it a waits the next interrupt signal. The routine goes to step (3) wherein the 160 sampled bits in the latch circuit 5 are read sequentially and stored in corresponding predetermined addresses of the RAM 7. Each memory area is previously reset to "0". "1" is added to the memory area if the sampled data is "1" (in a case when the received signal data $D_2$ is at the level of "1"). On the other hand, the addition is not performed when the sampling data is "0" (the received signal data $D_2$ is at a "0" level at the time of sampling).

The above-described RAM 7 has a number of addresses sufficient for storing samples for two pulse repetition cycles for each Loran-C pulse from the one master station and the two secondary stations. Since, in this embodiment, each Loran-C pulse is sampled 160 times in each of two cycles of repetition, and since there are eight transmission pulses for each station (excluding a ninth pulse for the master station) and there are three stations from which the Loran-C pulses are to be received, a total of 7680 ($=1680\times2\times8\times3$) memory cells are needed. In addition, if one memory cell comprises eight bits, a memory capacity of at least 7680 bytes is needed.

Next, the routine goes to step (4) of FIG. 4 wherein occurrence of interrupts triggered by signal $D_4$ are counted and if the total has not reached 48, control is returned to step (2). The number "48" corresponds to 24 Loran-C pulses for each of two pulse repetition cycles so that 160 bits of sampled data for each received pulse are tallied into the corresponding addresses in the RAM 7 for two repetition cycles.

After 7680 sampling values are prepared, the routine goes to step (5) wherein the counter A is incremented ($A=A+1$) and then to step (6) wherein the pointer to memory addresses in the RAM 7 is reset to its initial value, i.e., after the address 7680, the next address to be incremented will be a head address 0001, not address 7681. In the next step (7), the MPU 6 determines whether the value of the counter A has reached a predetermined value L. If $A\neq L$ in the step (7), the routine returns to the step (2). Consequently, the sampled data are tallied in the corresponding addresses of the RAM 7 for each Loran-C pulse from the master and secondary stations the predetermined number of times L.

The contents of memory MD reflects the amplitude of the received signal $D_1$ as illustrated in FIG. 3 after the sampled data are taillied in RAM 7 the predetermined number of times L. It should be noted that each vertical line segment of MD in FIG. 3 represents the contents of one memory address. Since the sample pulses PS are synchronous with the peaks of the carrier wave Ca, sample pulses Psn coincident with peaks in the carrier wave will very consistently produce sampled values of "1" for positive peaks and "0" for negative peaks. Of course, even sample pulses coincident with noise peaks $N_Z$ will produce misleading sampled values, but such values will be produced randomly. Thus, if the distribution is expressed as a Gaussian distribution, the probability of a sampled value being either "1" or a "0" may be assumed to be ½. Hence, if the number L is sufficiently large, the final, tallied value of memory addresses corresponding to periods of noise will approach $L/2$.

On the other hand, signal levels sampled at peaks within Loran-C pulses, such as at LP in FIG. 3, are also subject to random variations, especially at low S/N ratios, but will generally result in only small deviations in the total, tallied values MD from the theoretical targets L and zero. Thus, assuming that noise will produce discrepencies no larger than $\Delta l$, background noise as well as the zero-crossing points of the Loran-C signal will produce value between $L/2-\Delta l$ and $L/2+\Delta l$, while Loran pulse peaks will consistently produce values well above or below that range. This fact is used in subsequent processing to distinguish between noise and meaningful signal so as to resolve and track Loran-C signal pulses. Specifically, if the contents of a memory address is within the range ($L/2\pm\Delta l$), the MPU 6 recognizes that it is "either a zero-crossing point of the Loran-C signal or noise". In other cases, the MPU 6 will recognize that it corresponds to a peak of a Loran-C pulse.

In the step (8), the MPU 6 searches for the peaks of the Loran-C pulse by comparing the above-described sampled, tallied data to the predetermined reference range. While searchng for peaks, the address Ad(K) corresponds to the first peak of the Loran-C pulse being tracked, in this case, from the master station.

In the next step (9), the MPU 6 reads four values from four addresses, specifically, from every other address starting from the address Ad(K), i.e., Ad(K), Ad(K+2), Ad(K+4), and Ad(K+6), where the address Ad(K) corresponds to the first Loran-C pulse peak. Then arithmetic operations are performed to plot an envelope E of the Loran-C pulse as indicated these four values, which correspond to the first four peaks of the same polarity. The envelope E is derived by plotting the four values versus time, and then applying the method of least-squares to find the closest approximation to a smooth envelope. It should be noted that when the values are below $L/2$, they are inverted by performing the arithmetic operation $L-D$ (where D is the value stored in memory).

In the next step (10), the MPU 6 determines whether the data in the address Ad(K) corresponding to the initial peak of the received Loran-C pulse is larger than $L/2$. If the contents of Ad(K) is larger than $L/2$, the polarity of the corresponding peak is designated as being positive (+). On the other hand, if the contents of address Ad(K) is less than $L/2$, the polarity of the corresponding peak is designated as being negative (−).

If in step (10) the polarity of the peak is recognized to be positive (+), the MPU 6 compares the envelope E obtained in the step (9) with reference envelope data from a previously stored reference envelope data group 1 in a step (11). On the other hand, if in the step (10) the polarity at the address Ad(K) is recognized to be negative, the processing step (12) is executed in which the envelope E is compared with reference envelope data from a preset reference envelope data group 2.

The envelope V(t) from the first cycle to the sixth cycle of the carrier wave, i.e., the rising part of the Loran-C pulse LP is theoretically defined by the following expression:

$$V(t) = At^2 e^{-\frac{2t}{65}}, \quad (1)$$

wherein A is a constant number and $0\leq t\leq 65$ microseconds.

Figure 5:
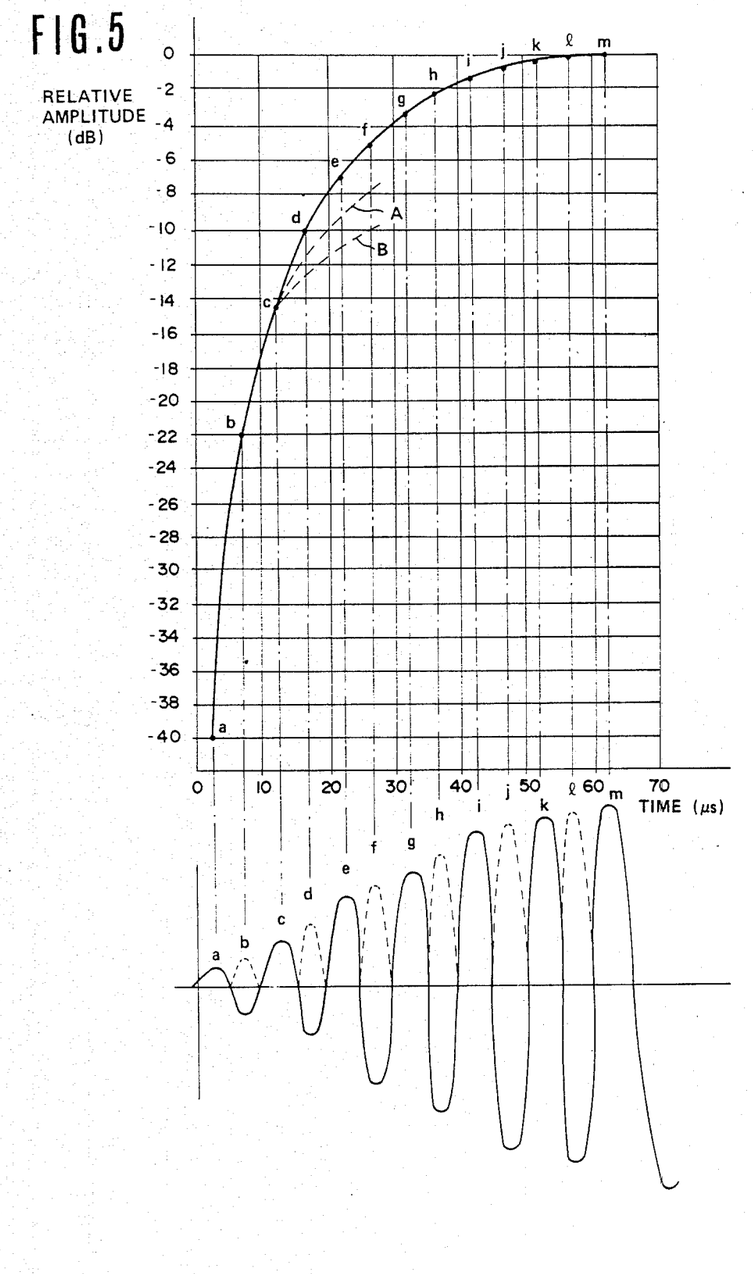
FIG. 5 is a graph of relative amplitudes of the rising peaks of one Loran-C pulse plotted in dB versus time in microseconds.
Figure 6:
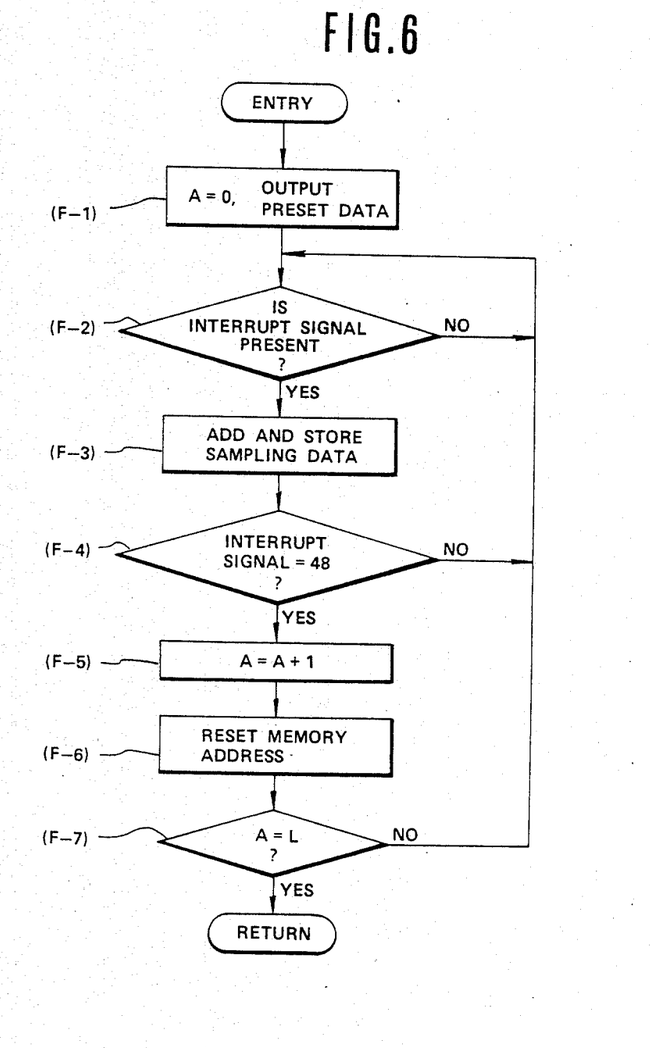
FIG. 6 is a first processing flowchart showing a sampled data storage/addition processing routine to be executed by the microprocessor shown in FIG. 2 constituting a second preferred embodiment in the Loran-C receiving apparatus.

FIG. 5 shows relative amplitudes in dB of various points along the reference envelope of the rising part of the above-described Loran-C pulse between $0\leq t\leq 65$ microseconds. In FIG. 5, points denoted by the letters a through j represent the peaks of both polarities from the first cycle to the sixth cycle of the Loran-C pulse.

The above-described reference envelope data group 1 includes the data for partial envelopes beginning at positive peaks, i.e., data for envelopes connecting each set of four peaks (a-b-c-d), (c-d-e-f), and (e-f-g-h). On the other hand, the reference envelope data group 2 includes the data for envelopes beginning at negative peaks, i.e., the data for envelopes connecting each set of four peaks (b-c-d-e), (d-e-f-g), and (f-g-h-i).

By comparing the envelope E obtained in the above-described step (9) with the reference envelope data in the above-described data group 1 or 2, the reference envelope which most closely matches the measured enveloped is found. Then, by noting which peak is the first in the reference envelope data, the actual position on the time axis of the peak corresponding to address Ad(K) can be detected. Hence, in the step (13), the third cycle can be identified on the basis of the reference envelope data which best matches the above-described envelope E. For example, if the address Ad(K) found in step (8) results in an envelope E in step (9) which is found in step (11) to most nearly fit the curve (c-d-e-f), then the address Ad(K) is recognized to be the positive peak of the second carrier-wave cycle. It is then a simple matter to find the first (in this case, positive) peak e of the third cycle at address Ad(K+4).

Selecting one of two groups of reference envelope data depending upon the polarity of the contents of address Ad(K) enhances the reliability of the match between the measured envelope E obtained in the step (9) and the reference envelope data. This is most clearly illustrated in dotted lines in FIG. 5. While the envelope covering points (c-d-e-f) deviates relatively slightly from the envelope (d-e-f-g) shown by the dotted curve A, the envelope (e-f-g-h) beginning at the point e which is the first positive peak subsequent to the point c is easily distinguishable from the envelope (c-d-e-f) as evident from the dotted curve B. In summary, using two kinds of reference envelope data depending on the polarity of the contents of address Ad(K) ensures that the difference between the reference envelope and the envelope E obtained in the step (9) is large enough to allow a clear match.

After execution of the steps (8) through (13) wherein the third cycle of the Loran-C signal of the master transmission station is detected, the subsequent steps (14) and (15) are executed wherein the third cycle of the Loran-C signals of the secondary transmission stations 1 and 2 are identified. These steps perform the same functions shown in the steps (8) through (13), but use the sampled and tallied data corresponding to the secondary stations 1 and 2. It should be noted that although in this embodiment the sampling time of the Loran-C signal is predetermined to be 400 microseconds per Loran-C pulse, it may be set to be within the extreme limit of delay time between directly transmitted and ionically reflected signals.

Next, a second preferred embodiment of the present invention will be described below.

The structure of the second preferred embodiment is the same as that of the first preferred embodiment shown in FIG. 2.

The theory behind identification of a particular cycle of the Loran-C signal will be described below.

The envelope V(t) of the pulse waveform from the first cycle to the sixth cycle, i.e., the rising part of the Loran-C pulse follows the following equation as described above:

$$V(t) = At^2 e^{-\frac{2t}{65}} \quad (1)$$

In FIG. 5, each of the points labelled with the letters a through l represents the relative amplitude of one of the positive and negative peaks from the first cycle to the sixth cycle of the carrier wave of the Loran-C pulse. Therefore, the amplitude value at each peak point obtained by actual measurement (referred to as an envelope data hereinafter) can be used to determine which point on the reference envelope the peak corresponds to by obtaining a standard deviation of a difference between the envelope data and reference envelope data. The reference envelope data refers to the amplitude at each point a, b, c, ..., l generated by equation (1). Let us now assume envelope data E(1), E(2), E(3), E(4), E(5), and E(6) for the six peak points starting from the first detected peak.

Also, for convenience, let us define a difference value D(n) between the envelope data E(1) through E(6) and reference envelope data R(1), R(2), R(3), R(4), R(5), and R(6) expressed as $D(n) = R(n) - E(n)$, where n denotes an integer between one and six.

The standard deviation $\sigma$ of difference value D(n) is the square root of the average of the squares of the differences between the different value D(n) for each point and the average value $\overline{D}$ of the difference values D(n), as expressed in the following equation:

$$\sigma = \sqrt{\frac{1}{6} \sum_{n=1}^{6} (D(n) - \overline{D})^2} \text{ , wherein } \overline{D} = \frac{1}{6} \sum_{n=1}^{6} D(n) \quad (2)$$

The above-described value $\sigma$ depends on which peak is first detected, i.e., which point of the Loran-C pulse corresponds to the value E(1). Since the measured envelope and the reference envelope will have approximately matching shapes if the value E(1) in fact represents the positive peak of the first cycle of the carrier wave of the Loran-C pulse (indicated by point a in FIG. 5), the difference value D(n) will be essentially constant for all values of n. Therefore, since $D(n) \cong \overline{D}$, there will be no variation and the standard deviation $\sigma$ will approach zero.

On the other hand, if the value E(1) represents the positive peak of the second cycle (indicated by point c in FIG. 5) since the first cycle of the carrier wave in the Loran-C pulse is not detected, a non-zero value of the standard deviation $\sigma$ will result since the measured envelope will not match the shape of the reference envelope.

The value of the standard deviation $\sigma$ is previously calculated for every one of the points a, b, c, d, e, f, g, h, i, j, k, and l in FIG. 5 to which the value E(1) may correspond. Thereafter, by comparing the measured standard deviation $\sigma$ with the pre-calculated values, it can be determined which peak of the carrier wave in the Loran-C pulse the value E(1) corresponds to.

FIG. 7(a) shows the theoretical values of the standard deviations on the difference values between the measured envelope and the reference envelope in the case where the point where a peak is first detected is any one of peak points a through j of the carrier wave of the Loran-C pulse shown in FIG. 5. However, the measured envelope data includes errors due to the effect of the noise in the received signal. Therefore, when determining which peak of the carrier wave the value E(1) correspond to, it is necessary to consider such errors.

Since the noise included in the Loran-C signal is considered to be random Gaussian noise, the values of the standard deviations $\sigma$ follow a Gaussian distribution (normal distribution) having a maximum width $\sigma n$. It should be noted that the distribution at the point a is a trailing half-peak starting at $\sigma = 0$.

Since the trace of the standard deviation $\sigma$ comprises a number of terms centered about the peaks a–j and the distribution terms of the standard deviation $\sigma$ may overlap between peak points, it cannot be reliably determined which of the cycles in the carrier wave the value E(1) corresponds to if the value of the standard deviation $\sigma$ falls in a region of overlap.

Figure 7:
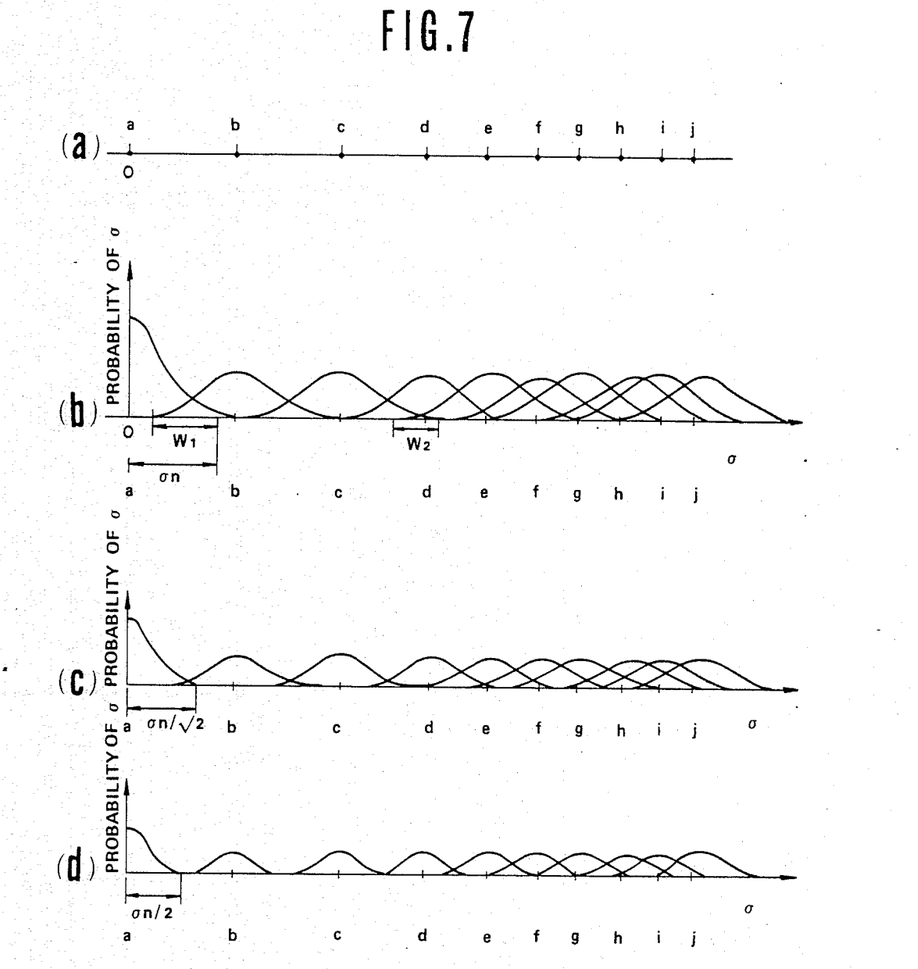
FIGS. 7(a) through (d) are diagrams of the standard deviation and probability distribution thereof for use in explaining the general principles of cycle identification.

For example, if the value of the standard deviation $\sigma$ falls within the range labelled $W_1$ in (b) of FIG. 7, the value E(1) might correspond to either point a or point b. Therefore, it cannot be determined whether the value E(1) corresponds to point a or boint b. In addition, the value E(1) may correspond to any one of the points c, d, or e if the standard deviation $\sigma$ falls within the range labelled $W_2$.

However, since the width of the distribution of the standard deviation $\sigma$ is due to the Gaussian noise included in the Loran-C signal, the width of the distribution is determined by the number of times the signal is sampled.

Supposing that the width of the distribution after L samples is $\sigma n$, the distribution at the case of 2 L samples and 4 L samples has a width of $\sigma n \sqrt{2}$ and $\sigma n \sqrt{2}$ respectively, as shown at (c) and (d) in FIG. 7.

In this way, in order to accurately determine to which peak the value E(1) corresponds when the standard deviation $\sigma$ thus obtained lies in a region of overlap, the number of sampling cycles l must be increased.

To determine to which cycle the value E(1) effectively corresponds, the system determines whether the value E(1) represents a positive peak or a negative peak. If the value E(1) is positive, the peak within the positive range of the Loran-C pulse carrier wave to which the value E(1) corresponds is found. That is to say, the system determines to which of the peaks a, c, e, g, and i the value E(1) corresponds. If the value E(1) is negative, the system determines to which of the peaks b, d, f, h, and j the value E(1) corresponds.

Specifically, the standard deviation $\sigma$ of the difference values between the envelope data E(1) through E(6) and first reference envelope data i.e., either the data for the points a, b, c, d, e, and f beginning at the positive peak of the first cycle inputted as the first reference envelope data or the data of each point b, c, d, e, f, and g beginning at the negative peak of the first cycle inputted as the second reference envelope data, is obtained. The system can determine from the results of this comparison which point a, c, e, g, and i the value E(1) corresponds to from the distribution of the value of standard deviation previously calculated in the case when the value E(1) corresponds to one of the positive peaks a, c, e, g, and i as shown in FIG. 8(I)(a) through (c).

In addition, if the value E(1) represents a negative peak, the standard deviation $\sigma$ of the difference values between the envelope data E(1) through E(6) and second reference envelope data is obtained. Thereafter, the system can determine to which of the points b, d, f, h, and j the value E(1) corresponds from the distribution of the previously calculated values of the standard deviation in the case when the value E(1) corresponds to one of the negative peaks b, d, f, h, and j.

In summary, by segregating the distributions of the standard deviation values into separate series for the position and negative peaks, the number of sampling cycles needed for positive identification of the peak corresponding to the value E(1) is greatly reduced.

Figure 9:
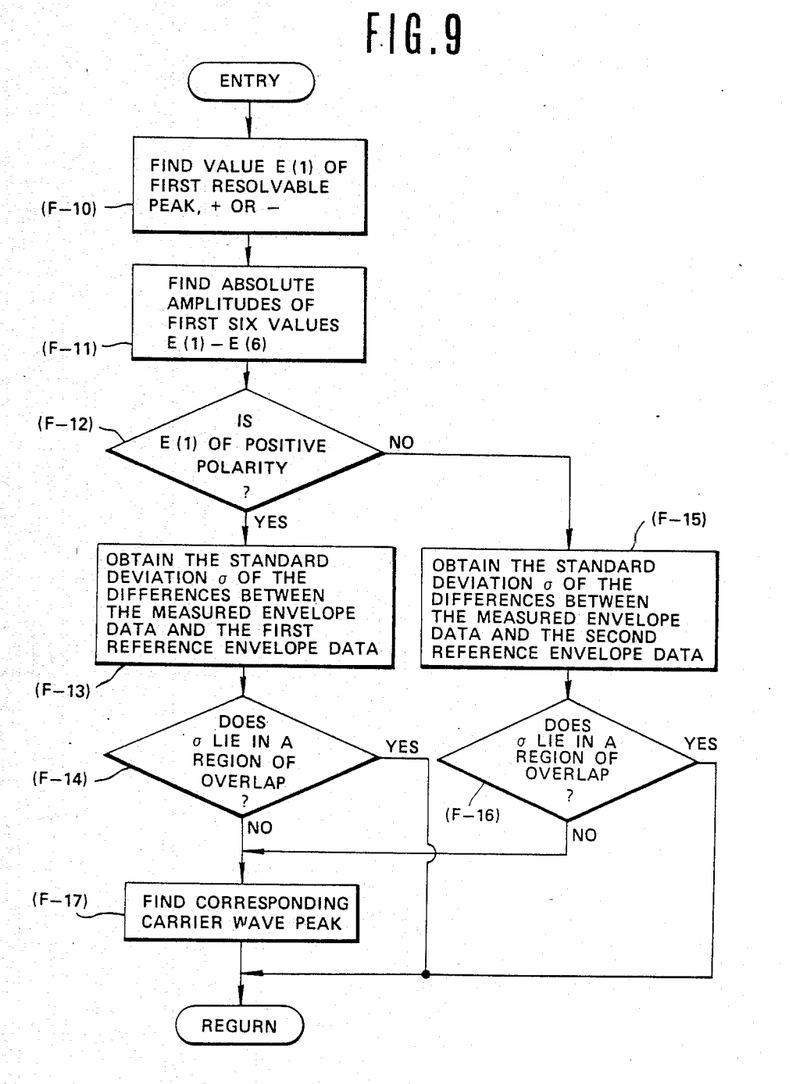
FIG. 9 is a processing flowchart of a second cycle identification processing routine.

The program shown in FIG. 9 practically employs the theory described above. FIG. 9 is a flowchart of a routine for deciding how many cycles of sampling are required.

In the first step (F-10), the measured values derived as with MD in FIG. 3 are compared to the range $L/2 \pm \Delta l$. In this step, the first value E(1) to fall out of the range $L/2 \pm \Delta l$ is recognized as the first peak of the Loran-C pulse.

In addition, the polarity is positive if the data is greater than $L/2 + \Delta l$ and conversely the polarity is negative if the data is not greater than $L/2 - \Delta l$. Next, in step (F-11), the absolute values of the differences between the value $L/2$ and value E(1) and the next 5 peak points (i.e., every other sample up to $Ad(E(1)+10)$) are found to derive the measured envelope data E(1), E(2), E(3), E(4), E(5), and E(6).

In step (F-12), the polarity obtained in the step (F-10) is checked. If the polarity is positive, the standard deviation $\sigma$ of the difference values between the envelope data obtained in the step (F-11) and previously obtained first reference envelope data is calculated.

Then, the value of the standard deviation $\sigma$ obtained in the step (F-14) is checked to see if it lies in any of the regions of overlap labelled $U_1$ through $U_4$ in (a) of FIG. 8(I).

If the value of the standard deviation $\sigma$ does not lie in any of the regions of overlap, then no more samples are necessary and so in step (F-17), the carrier wave peak to which the value E(1) corresponds can be found immediately.

In the step (F-14), if the value of the standard deviation $\sigma$ does lie in a region of overlap, the corresponding peak cannot be unambiguously identified and so and the program shown in FIG. 9 recycles without executing step (F-17).

Figure 8:
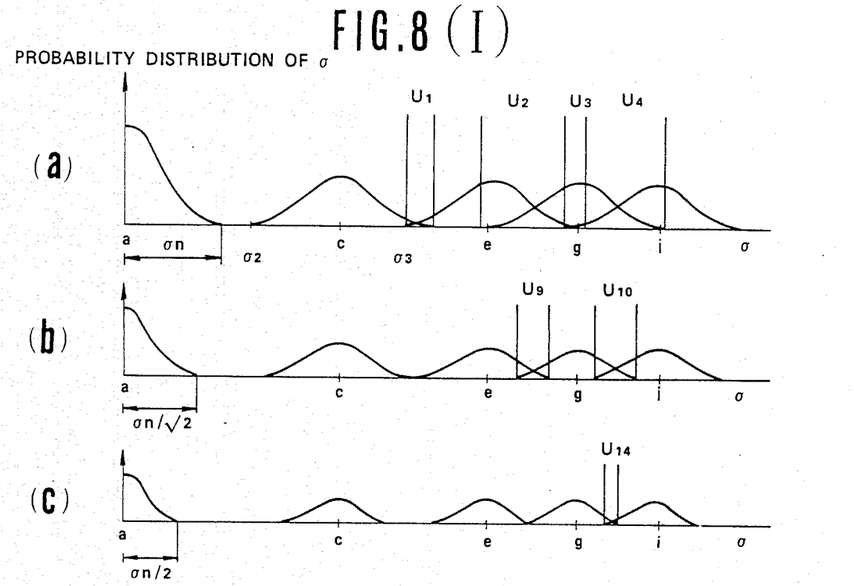

On the other hand, if the polarity is determined to be negative in the step (F-12), the standard deviation $\sigma$ of the difference values between the envelope data and second reference value is calculated in step (F-15). Thereafter, control passes to step (F-16) in which the value of standard deviation $\sigma$ between the envelope data and second reference envelope data is checked to see if it lies in any of the regions of overlap labelled $U_5$ through $U_8$ in (d) of FIG. 8(II).

If the value of the standard deviation $\sigma$ does not lie in any of the regions of overlap, the carrier wave peak corresponding to the value E(1) is found in step (F-17). Otherwise, the program recycles directly after step (F-16).

Figure 10:
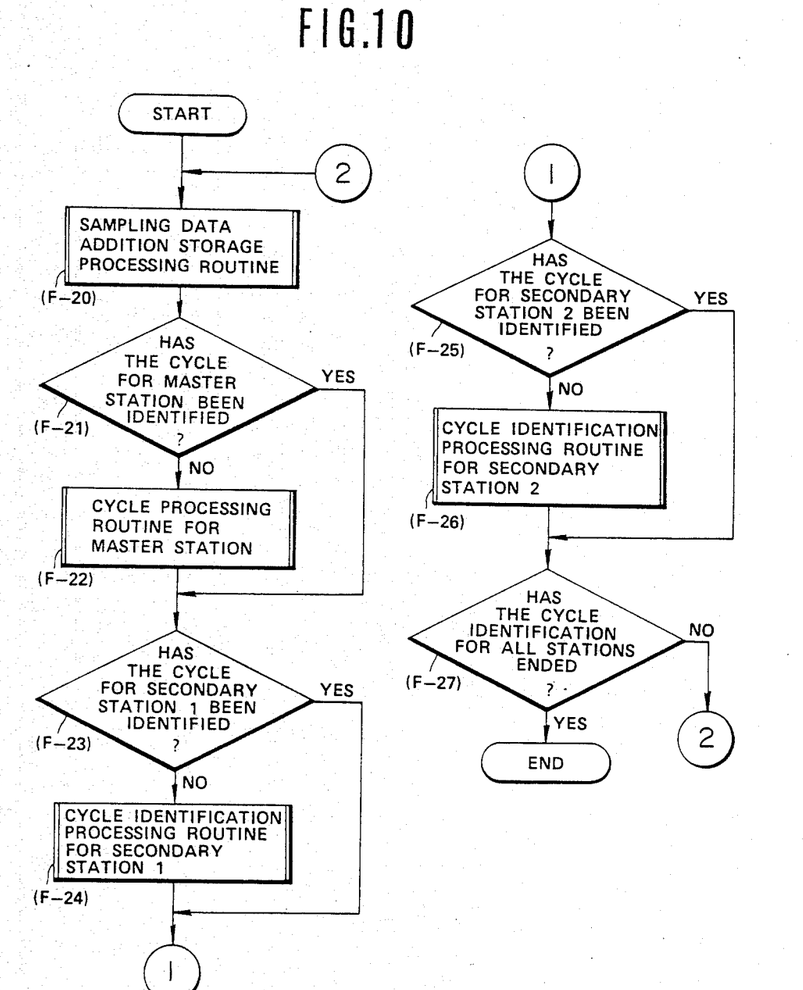
FIG. 10 is a general flowchart of a general program for identifying the particular cycle of the carrier wave to be executed by the microprocessor shown in FIG. 2 showing the second preferred embodiment.

FIG. 10 is a general processing flowchart for the system in the second preferred embodiment according to the present invention. The general processing flowchart shown in FIG. 10 is executed after successfully tracking a zero-crossing point of the carrier wave.

First, in step (F-20) the sampling routine shown in FIG. 3 is executed. A number of sampling cycles L is performed for each sampling point (i.e., every quarter carrier cycle), for each station. Next, in the step (F-21) if the first detected peak in the case of the master transmission station has not yet been identified, the cycle identification routine shown in FIG. 9 is executed for the master transmission station. The cycle identification routine for the master transmission station executes for one cycle regardless of whether or not the carrier wave peak is identified. Next in the step (F-23), if the first detected peak of the secondary transmission station 1 has not yet been identified, the cycle identification routine is tried in the same way for the secondary transmission station 1 in step (F-24). If the first resolvable peak of the secondary transmission station 2 has not been identified in the subsequent step (F-25), cycle identification for the secondary transmission station is tried in step (F-26). The final step (F-27), checks to see if all of the first peaks of the master transmission station and the secondary transmission stations 1 and 2 have been identified. If there is still a transmission station for which the third carrier wave cycle has not been identified, the routine returns to the step (F-20) wherein sampling is repeated for another L cycles. Thus, sampling is performed for a total of 2 L times. The cycle identification is then attempted again for transmission stations for which the identification has not yet been successful. In this way, sampling is repeated until the cycle identification is made for all the stations, i.e., the master transmission station and the secondary transmission stations.

It should be noted that although in this embodiment cycle identification is performed for the master and two secondary transmission stations 1 and 2 using the standard deviation $\sigma$ of the difference values between the measured envelope data and reference envelope data, the same effect can be achieved by using the variance $\sigma^2$, i.e., the square of the standard deviation.

It should also be noted that although in this embodiment the sampling period for each Loran-C pulse is 400 microseconds, the sampling period may be optimized in consideration of various conditions, such as the maximum delay time between the spatial wave and the surface wave.

As described hereinabove, the Loran-C receiving apparatus according to the present invention makes an accurate identification of the carrier wave cycle by means of the variance or standard deviation so that the third cycle or another specified cycle can accurately be identified in a short period of time, even though the first or second cycle of the Loran-C pulse carrier wave cannot be resolved due to a disadvantageous S/N ratio.

It will be fully understood by those skilled in the art that the foregoing description is made in terms of preferred embodiments and various changes and modifications mode make without departing from the spirit and scope of the present invention, which is to be defined by the appended claims.

What is claimed is:

1. A system for identifying a particular carrier wave cycle in individual Loran-C pulses of a received Loran-C signal in a Loran-C receiving apparatus, comprising:
    (a) means for measuring the envelope of the carrier wave peaks of the received Loran-C signal over a known portion of a Loran-C pulse including said particular cycle; said envelope measuring means including:
        (i) first means for converting the received Loran-C signal into a binary signal, the two levels of which indicate a received signal amplitude above an below a fixed threshold level, respectively;
        (ii) second means for sampling the converted signal a first predetermined number of times;
        (iii) third means for storing each sampled Loran-C signal value of each sampled Loran-C pulse received from a master and at least two secondary transmission stations constituting one Loran-C chain in corresponding memory addresses;
        (iv) fourth means for integrating the sampled Loran-C signal value in each memory address over a second predetermined number of sample cycles;
        (v) fifth means for sequentially comparing the contents of each of the memory addresses with a reference level so as to find a first address corresponding to the first time point at which the Loran-C signal level is distinguishable from background noise;
        (vi) sixth means for reading the contents of a plurality of memory addresses, the corresponding time points of which are immediately subsequent to and in phase with the time point corresponding to said first address; and
        (vii) seventh means for deriving the envelope which best fits the values of the first and subsequent addresses;
    (b) means for storing a reference envelope corresponding to said known portion; and
    (c) means for comparing the measured envelope and the reference envelope and identifying said particular cycle of the received Loran-C pulse on the basis of the results of the comparison.

2. The system as set forth in claim 1, which further comprises:
    eighth means for detecting the polarity of the Loran-C signal at the time point corresponding to the first address by determining whether the value in the first address is greater than a first reference level or less than a second reference level.

3. The system as set forth in claim 2, wherein said both envelope comparing means compares the derived envelope with a first group of reference envelope curves when said eighth means determines that the value in the first memory address is greater than said first reference level, and said both envelope comparing means compares the derived envelope with a second group of reference envelope curves when said eighth means determines that the value in the first address is less than said second reference level.

4. The system as set forth in claim 3, wherein the curves of each of said first and second groups start at different sampled time points in the vicinity of said particular cycle, and said both envelope comparing means determines which of said reference envelope curves said derived envelope best fits so as to recognize the timing of said first address relative to said particular cycle.

5. The system as set forth in claim 1, wherein said second means samples the converted Loran-C signal starting a predetermined period of time before the onset of each Loran-C pulse.

6. The system as set forth in claim 5, wherein said predetermined period of time is within the maximum delay between a directly transmitted Loran-C signal and one reflected by ionized atmospheric layers.

7. The system as set forth in claim 6, wherein said predetermined period of time is 400 microseconds.

8. The system as set forth in claim 3, wherein said first and second reference level corresponds to half of said second predetermined number of sample cycles incremented and decremented by a fixed number, respectively.

9. The system as set forth in claim 1, wherein said both envelope comparing means comprises:
  (a) first means for calculating a standard deviation of the differences between values on the measured envelope and the reference envelope; and
  (b) second means for determining the particular cycle of a carrier wave in each Loran-C pulse on the basis of the calculated value of the standard deviation.

10. The system as set forth in claim 1, wherein said both envelope comparing means comprises:
  (a) first means for calculating a variance of the differences between values on the measured envelope and the reference envelope; and
  (b) second means for determining the particular cycle of a carrier wave in each Loran-C pulse on the basis of the calculated value of the calculated variance.

11. The system as set forth in claim 10, wherein said second predetermined number is a variable value chosen to be large enough that for the currently calculated standard deviation there is only one time point with a significant probability of being the time point corresponding to said first address.

12. The system as set forth in claim 3, wherein said reference envelope storing means stores said first and second reference envelope curves on the basis of the equation;

$$V(t) = At^2 e^{-\frac{2t}{65}},$$

wherein A is a constant number and $0 \leq t \leq 65$ microseconds.

13. A system for identifying a particular carrier wave cycle in individual Loran-C pulses of a received Loran-C signal in a Loran-C receiving apparatus, comprising:
  (a) means for measuring peak values of the carrier wave of the received Loran-C signal over a known portion of a Loran-C pulse including said particular cycle, thereby to provide a measurement of the envelope of the peak values of the carrier wave;
  (b) means for storing a reference envelope of peak values corresponding to said known portion;
  (c) means for comparing the measured envelope of measured values and the reference envelope of peak values and identifying a location on the actual Loran-C envelop wherein the measured envelope of measured peak values lies in order to identify the particular carrier wave cycle on the basis of the comparison; and
  (d) said means for comparing including means for performing a least-squares fit between said reference envelope and said measured envelope to identify the location wherein the measured envelope lies.

14. A system as recited in claim 13 wherein said means for performing a least-squares fit includes means for obtaining a standard deviation of difference values between measured peak values forming the measured envelope and the peak values forming said reference envelope; and
  (a) means for comparing the standard deviation with precalculated values of standard deviation for a plurality of locations to which the measured envelope may correspond on the Loran-C envelope.

15. A system as recited in claim 14 further comprising sampling rate increase means responsive to said means for performing the standard deviation for increasing the sampling rate when the standard deviation falls within a probability distribution for previously calculated standard deviations of a plurality of locations of the measured envelope on the Loran-C envelope.

* * * * *